United States Patent [19]

Kakeya

[11] Patent Number: 4,716,728

[45] Date of Patent: Jan. 5, 1988

[54] HYDRAULIC DRIVE SYSTEM FOR COUNTERWEIGHT DOLLY IN COUNTERBALANCE TYPE CRANE

[75] Inventor: Mitsuo Kakeya, Hyogo, Japan

[73] Assignee: Kabushiki Kaisha Kobe Seiko Sho, Kobe, Japan

[21] Appl. No.: 927,863

[22] Filed: Nov. 7, 1986

[30] Foreign Application Priority Data

Feb. 3, 1986 [JP] Japan .............................. 61-14170[U]

[51] Int. Cl.[4] .............................................. F16D 31/02

[52] U.S. Cl. .......................................... 60/426; 60/484; 60/486; 60/493; 91/461; 91/523; 212/196; 212/198

[58] Field of Search .................. 60/493, 484, 486, 426; 91/461, 536, 523; 212/189, 196, 198

[56] References Cited

U.S. PATENT DOCUMENTS 3,954,046 5/1976 Stillhard ............................ 91/457 X
4,165,613 8/1979 Bernhoft et al. .................. 91/461 X
4,362,018 12/1982 Torii ................................. 60/493 X
4,540,097 9/1985 Wadsworth et al. ............... 212/196

*Primary Examiner*—Edward K. Look

*Attorney, Agent, or Firm*—Oblon, Fisher, Spivak, McClelland, & Maier

[57] ABSTRACT

A hydraulic drive system for a counterweight dolly in a counterbalance type crane having a crane body provided with a lower travelling structure an upper swivelling structure and the counterweight dolly connected to the rear portion of the upper swivelling structure through a connecting member, characterized by including a swivelling hydraulic motor for swivelling the upper swivelling structure of the crane body; a swivelling control valve for controlling the pressure of hydraulic oil to be fed to the swivelling hydraulic motor; a hydraulic circuit for swivelling operation which controls the amount of operation of the swivelling control valve; a hydraulic motor for the counterweight dolly which drives each wheel of the dolly; a dolly control valve for controlling the pressure of hydraulic oil to be fed to the hydraulic motor for the counterweight dolly; and a control circuit for actuating the dolly control valve in accordance with an operational pressure of the hydraulic circuit for swivelling operation and thereby controlling the driving pressure for the hydraulic motor for the dolly under a pressure proportional to the driving pressure for the swivelling hydraulic motor.

5 Claims, 2 Drawing Figures

HYDRAULIC DRIVE SYSTEM FOR COUNTERWEIGHT DOLLY IN COUNTERBALANCE TYPE CRANE

BACKGROUND OF THE INVENTION

1. Field of the Invention

The present invention relates to a hydraulic drive system for a counterweight dolly in a counter balance type crane.

2. Description of the Prior Art

As a large-sized travelling type crane there has been known a counterbalance type crane as described, for example, in U.S. Pat. No. 3,842,984 in which a counterweight dolly is connected to the rear portion of an upper swivelling structure to improve the lifting capacity, and drive units are connected to wheels of the counterweight dolly to drive the wheels during swivelling and travelling of the upper swivelling structure of the crane body, thereby allowing the dolly to swivel around a swivelling center of the upper swivelling structure and travel simultaneously with the crane body. A counterbalance type crane which utilizes a hydraulic pressure for effecting the upper swivelling and travelling motions of the crane body has also been used.

However, in the above hydraulically driven crane, a swivelling hydraulic circuit and a travelling hydraulic circuit for the upper swivelling structure of the crane body and a dolly wheel driving hydraulic circuit are independent of each other, so the driving pressure of a swivelling hydraulic motor for the upper swivelling structure and that of a wheel driving hydraulic motor for the dolly are apt to become unbalanced due to a variation of load such as a lifting load or inclination or unevenness of the ground, particularly during swivelling motion, resulting in the fact that the upper swivelling structure and the dolly do not swivel smoothly, leading to deterioration of the craning work and a great reduction of working efficiency. If the driving force of the dolly is deficient, the swivelling hydraulic motor for the upper swivelling structure will be driven in an overloaded state, resulting in increased relief flow of the swivelling hydraulic circuit and increased power loss. Further, in order that both the upper swivelling structure and the dolly can swivel even under a variation in the driving force for swivelling the upper swivelling structure and in the driving force of the dolly, it is necessary to enlarge the size of a swivelling drive unit for the upper swivelling structure and a drive unit for the dolly. Additionally, a connecting beam which connects the upper swivelling structure and the dolly is also required to have a high strength, resulting in an increase in size and weight of the connecting beam, thus leading to an increase in cost. Thus, various problems have been involved in the conventional cranes.

SUMMARY OF THE INVENTION

According to the present invention, which has been accomplished for overcoming the above-mentioned problems, there is provided a hydraulic drive system permitting automatic smooth swivelling motion of a counterweight dolly simultaneously with swivelling of an upper swivelling structure of a crane body, capable of greatly improving work accuracy of the crane and efficiency, capable of enhancing an energy saving effect with the least likelihood of overload of both a swivelling drive system for a counterweight dolly, capable of reducing the size of both drive systems, capable of reducing the size and weight of a connecting member which connects the upper swivelling structure and the dolly, further capable of simplifying the structure of a control system thereby attaining a substantial reduction in cost, and capable of improving the operating and controlling characteristics.

The present invention is directed to a hydraulic drive system for a counterweight dolly in a counterbalance type crane having a crane body provided with a lower travelling structure and an upper swivelling structure and the counterweight dolly connected to the rear portion of the upper swivelling structure through a connecting member, characterized by including a swivelling hydraulic motor for swivelling the upper swivelling structure of the crane body; a swivelling control valve for controlling the pressure of hydraulic oil to be fed to the swivelling hydraulic motor; a hydraulic circuit for swivelling operation which controls the amount of operation of the swivelling control valve; a hydraulic motor for the counterweight dolly which drives each wheel of the dolly; a dolly control valve for controlling the pressure of hydraulic oil to be fed to the hydraulic motor for the counterweight dolly; and a control circuit for actuating the dolly control valve in accordance with an operational pressure of the hydraulic circuit for swivelling operation and thereby controlling the driving pressure for the hydraulic motor for the dolly into a pressure proportional to the driving pressure for the swivelling hydraulic motor.

In this construction, the driving pressure for the swivelling hydraulic motor is controlled in accordance with an operational pressure of the hydraulic circuit for swivelling operation of the upper swivelling structure, and at the same time the driving pressure for the dolly wheel driving hydraulic motor is controlled at a pressure proportional to the driving pressure for the swivelling hydraulic motor, whereby the upper swivelling structure and the dolly are swivelled smoothly and in synchronism with each other.

A more complete appreciation of the invention and many of the attendant advantages thereof will be readily obtained as the same becomes better understood by reference to the following detailed description when considered in connection with the accompanying drawings, wherein:

DESCRIPTION OF THE PREFERRED EMBODIMENT

Figure 2:
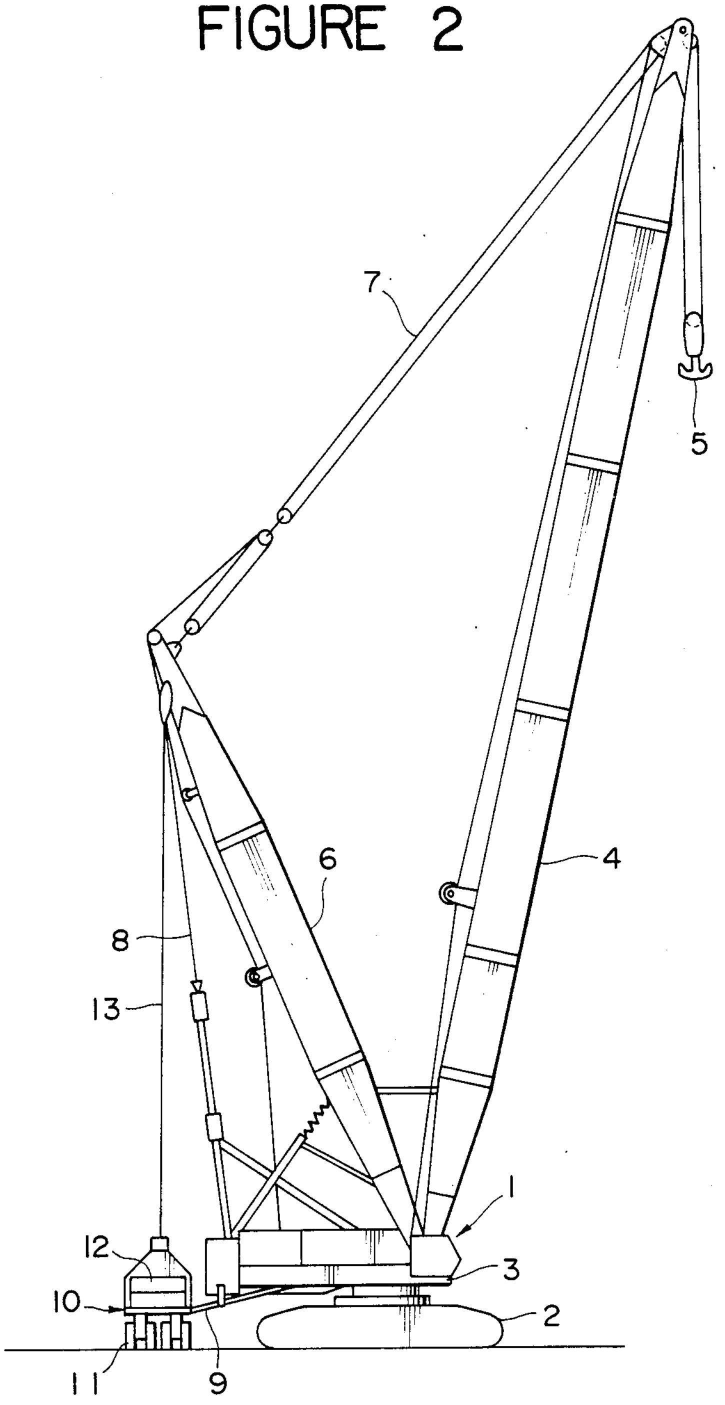
FIG. 2 is a side view of the whole of a counterbalance type crane.

The entire construction of the counterbalance type crane will now be described with reference to FIG. 2. In FIG. 2, a crane body 1 is provided with a lower travelling structure 2, an upper swivelling structure 3, a main jib 4, a hanger 5, a mast 6, a guy line 7 for the main jib, and a guy line 8 for the mast. A counterweight dolly 10 is provided at the lower portion thereof with a plurality of wheels 11 each capable of being steered about a vertical shaft and capable of rotating about a horizontal shaft, and a counterweight 12 is carried on the dolly 10. The dolly 10 is connected to the rear portion of the upper swivelling structure 3 of the crane body 1 through a connecting member 9 such as a beam, and it is also connected to a guy line 13 for the counterweight dolly suspended from an upper end of the mast 6.

Figure 1:
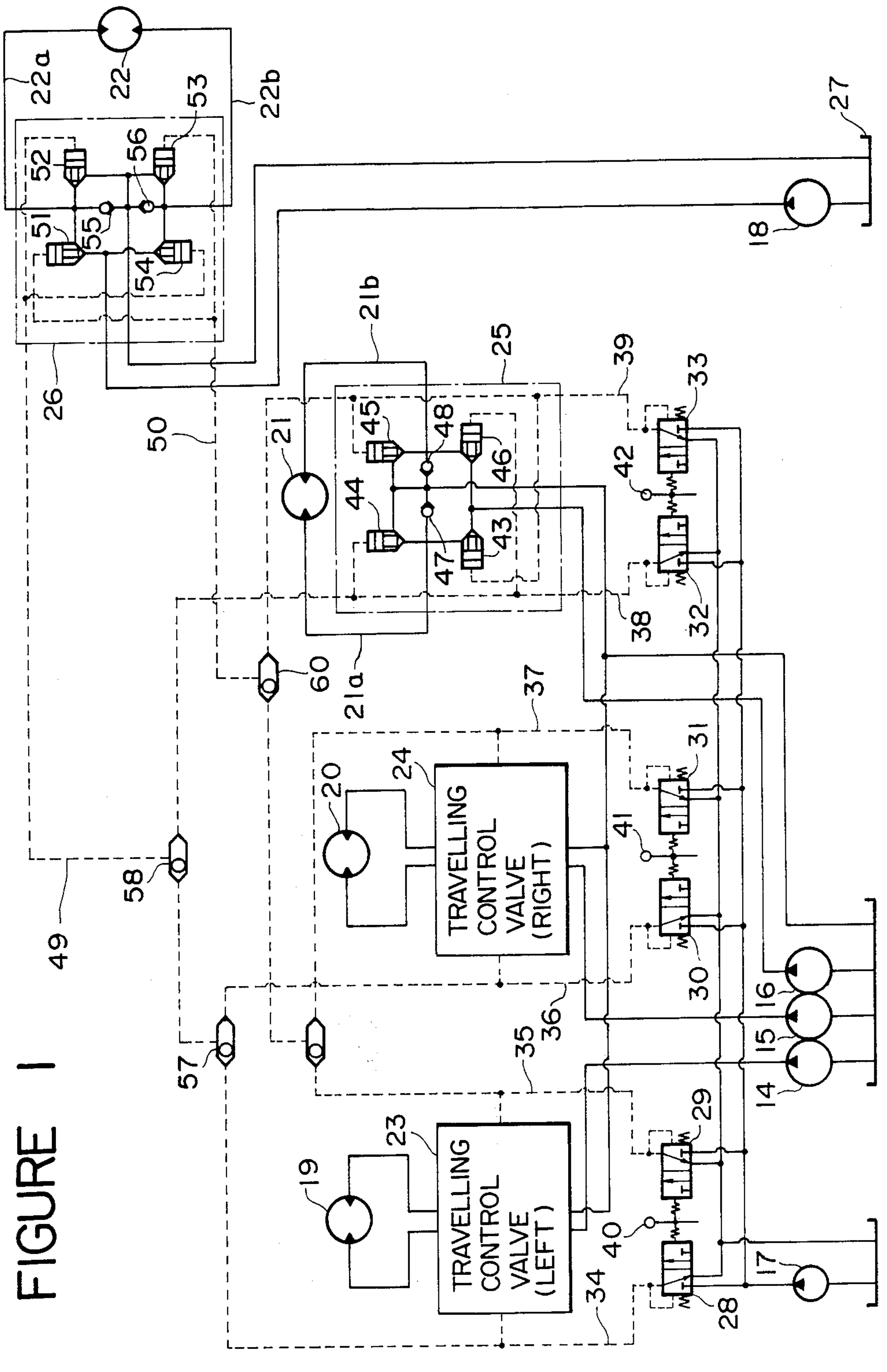
FIG. 1 is a hydraulic circuit diagram showing an embodiment of the present invention.

Referring now to FIG. 1, there is illustrated a hydraulic circuit of a principal portion of the above crane, in which the reference numerals 14, 15, 16, 17 and 18 denote hydraulic pumps; numerals 19 and 20 denote left and right travelling hydraulic motors for driving left and right crawlers of the lower travelling structure 2 shown in FIG. 2; numeral 21 denotes a swivelling hydraulic motor for swivelling the upper swivelling structure; numeral 22 denotes a hydraulic motor for the dolly for driving the wheels 11 of the counterweight dolly 10; numerals 23 and 24 denote travelling control valves; numeral 25 denotes a swivelling control valve; numeral 26 denotes a dolly control valve; and numeral 27 denotes a tank.

Numerals 28 and 29 denote left-hand travelling operation valves; numerals 30 and 31 denote right-hand travelling operation valves; and numerals 32 and 33 denote swivelling operation valves. These operation valves are variable reducing valves, which are connected at a primary side to the hydraulic pump 17 for operation and connected at a secondary side to pilot lines 34, 35, 36, 37, 38 and 39 for change-over of the control valves 23, 24 and 25. A secondary pressure (operating pressure) conducted to each said changing-over pilot line is controlled according to the directions and degree of operation of operating levers 40, 41 and 42. An operating hydraulic circuit is constituted by the operating hydraulic pump 17, the operating valves 28 to 33 and the pilot lines 34 to 39.

As the swivelling control valve 25, which is a pressure control valve, there is used logical valve constituted by the combination of four check valves 43, 44, 45 and 46 for both direction control and pressure control whose passage blocking force is controlled by the pilot pressure conducted from the swivelling operation valves 32 and 33 to the pilot lines 38 and 39, and cavitation preventing check valves 47 and 48. For the travelling control valves 23 and 24 there may be used spool type direction control valves, although in this embodiment there are used pressure control valves of the same structure as the swivelling control valve 25.

For the car control valve 26, which is a pressure control valve of the same structure as the swivelling control valve 25, there is used a logical valve constituted by the combination of four check valves 51, 52, 53 and 54 for both direction control and pressure control and whose passage blocking force is controlled by the pilot pressure conducted to pilot lines 49 and 50, and cavitation preventing check valves 55 and 56. For example, operating pressures for change-over communicated from the forward travelling operation valves 28 and 30 and the left-hand swivelling operation valve 32 are communicated to one pilot line 49 through high pressure selection valves 57 and 58, while operating pressures for change-over communicated from the rearward travelling operation valves 29 and 31 and the right-hand swivelling operation valve 33 are conducted to the other pilot line 50 through high pressure selection valves 59 and 60. A control circuit for the dolly control valve 26 is constituted by the high pressure selection valves 57 to 60 and the pilot lines 49 and 50.

In the above construction, for performing swivelling operation, first the wheels 11 of the counterweight dolly 10 are steered in a swivelling direction by a steering means (not shown) and thereafter the swivelling operation lever 42 is operated leftwards, for example, whereby an operating pressure proportional to the amount of operation of the lever is communicated from the left-hand swivelling operation valve 32 to the pilot line 38. This operating pressure is communicated to the rear portions of the second and fourth check valves 44 and 46 of the swivelling control valve 25 to thereby close the check valves 44 and 46. The first and third check valves 43 and 45 are in a free state because no pressure is communicated to the pilot line 39. Consequently, the hydraulic oil from the hydraulic pump 16 is communicated to one line **21*a* of the swivelling hydraulic motor 21 through the first check valve 43, and the oil discharged from the motor 21 is returned to the tank 27 through the other line 216 and then through the third check valve 45, whereby the hydraulic motor 21 is rotated forward and the upper swivelling structure 3 of the crane body 1** is swivelled leftwards.

In this case, the operating pressure communicated to the line 38 is controlled according to the amount of operation of the swivelling operation lever 42, and in proportion to this operating pressure the blocking forces of the second and fourth check valves 44 and 46 are controlled to thereby control the pressure relieved from the hydraulic pump 16 to the tank 27 through the second and fourth check valves 44 and 46, so that the pressure communicated from the hydraulic pump 16 to the line **21*a* through the first check valve 43 is controlled so as to thereby control the driving pressure for the swivelling hydraulic motor 21. In this way the swivelling hydraulic motor 21 is driven by a driving pressure in a manner proportional to the amount of operation for the operating lever 42**.

On the other hand, during the above swivelling motion, the operating pressure conducted from the swivelling operation valve 32 to the pilot line 38 is further conducted through the high pressure selection valve 58 and the pilot line 49 to the rear portions of the second and fourth check valves 52 and 54 of the control valve 26 for the dolly. Thereafter, under the same action as in the case of the swivelling control valve 25, the hydraulic oil from the hydraulic pump 18 is communicated to one line **22*a* of the hydraulic motor 22 for the dolly, while the oil discharged from the motor 22 is returned to the tank 27 through the other line 22*b* and further through the third check valve 53, so that the hydraulic motor 22 is rotated forward, the wheels 11 of the dolly 10 are driven forward, and the dolly 10 is swivelled integrally with the upper swivelling structure 3**.

In this case, moreover, like the case of the swivelling control valve 25, the closing force of the second and fourth check valves 52 and 54 is controlled according to the operating pressure conducted to the pilot line 49, and according to this closing force the pressure communicated from the hydraulic pump 16 to the line **22*a* through the first check valve 51 is controlled to thereby control the driving pressure for the hydraulic motor 22 for the dolly. As a result, the hydraulic motor 22 for the dolly is driven by a driving pressure proportional to the operating pressure communicated to the pilot line 49, namely, the amount of operation of the operating lever 42, and the driving pressure for the swivelling hydraulic motor 21**.

The same control as noted above is also performed during rightward swivelling operation.

The following functions and effects are attained by the above controls.

(1) By the operation of only one operating lever 42 the swivelling control valve 25 and the dolly control valve 26 can be actuated to drive the swivelling hydraulic motor 21 and at the same time drive the hydraulic motor 22 for the dolly, permitting a smooth swivelling motion of the upper swivelling structure 3 on the car 1 and that of the dolly 10 in complete synchronism with each other.

(2) Even when a large load pressure is applied to the swivelling hydraulic motor 21 for the upper swivelling structure 3 at the time of start-up of swivelling motion, the driving pressure for the hydraulic motor 20 for the dolly is also increased by increasing the amount of operation of the operating lever 42 so as to increase the driving pressure for the swivelling hydraulic motor 21, so that the motor 20 is driven by a large driving force and the load imposed on the swivelling hydraulic motor 21 is immediately diminished. Consequently, the relief flow becomes smaller and the power loss is reduced, thus enhancing the energy saving effect.

(3) The swivelling control valve 25 and the dolly control valve 26 are controlled by the operating pressure communicated to the pilot lines 38, 49 and 39, 50 upon actuation of the lever to thereby control the driving pressure for the swivelling hydraulic motor 21 and that for the hydraulic motor 22 for the dolly, so that not only the control circuit piping can be simplified by the use of low pressure pipes, but also an accurate control is ensured and improvement can be attained in controlling and operating characteristics.

(4) Since the upper swivelling structure 3 and the dolly 10 are swivelled in synchronism with each other, the load imposed on the connecting member 9 which interconnects the upper swivelling structure 3 and the dolly 10 becomes smaller, and therefore the connecting member 9 can be reduced in size and weight.

(5) Even in the event of a variation in load of the hydraulic motors 21 and 22, the load variation is shared by the upper swivelling structure 3 and the dolly 10, namely, by the swivelling hydraulic motor 21 and the hydraulic motor 22 for the dolly, through the connecting member 9, so that the loads imposed on the motors 21 and 22 are diminished, whereby the probability of occurrence of problems is decreased. Further, it is possible to reduce the size and weight of the motors 21 and 22, simplify the control circuit, and make the connecting member 9 smaller in size and weight, thus permitting a remarkable reduction of cost.

During travelling, the wheels 11 of the dolly 10 are steered in a travelling direction by a steering means (not shown), and in this state the travelling operation levers 40 and 41 are operated to actuate the travelling control valves 28, 30 or 29, 31, whereby the travelling hydraulic motors 19 and 20 are driven under the same action as in the above swivelling operation, so that the crane body 1 is allowed to travel and at the same time the hydraulic motor 22 for the dolly is driven by a driving pressure proportional to the travelling drive pressure of the crane body 1 automatically, permitting a smooth travelling of the dolly 10 in synchronism with the crane body 1.

In the above embodiment the control valve 24 for the dolly is controlled from both the swivelling drive system and the travelling drive system of the crane body 1, but even if the control from the travelling control system is omitted, the desired object of the present invention can be achieved because the work of the crane while travelling is less frequent than the swivelling work.

According to the present invention, as set forth hereinabove, the driving pressure for the swivelling hydraulic motor of the upper swivelling structure can be controlled according to an operational pressure of the swivelling hydraulic circuit for the upper swivelling structure, and at the same time the driving pressure for the dolly wheel driving hydraulic motor can also be controlled thereby, so the swivelling hydraulic motor for the upper swivelling structure and the hydraulic motor for the dolly can always be driven in synchronism with each other, and the upper swivelling structure and the dolly can always be swivelled smoothly, thus permitting a remarkable improvement in working accuracy and efficiency. Besides, since the driving pressure for the swivelling hydraulic motor and that for the dolly hydraulic motor can be controlled simultaneously according to an operational pressure from the hydraulic circuit for swivelling operation, it is possible to attain a remarkable improvement in the operating and controlling characteristics, and the loads imposed on both motors are diminished mutually so that the probability of occurrence of difficulties can be decreased. Consequently, not only both motors can be made smaller in size but also the load imposed on the connecting member can be diminished and hence it is possible to reduce the size and weight of the connecting member, thus permitting a remarkable reduction in cost.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic drive system for a counterweight dolly, having a plurality of wheels, in a counterbalance type crane having a crane body provided with a lower travelling structure and an upper swivelling structure wherein the counterweight dolly is connected to the rear portion of the upper swivelling structure through a connecting member, comprising:

a swivelling hydraulic motor for swivelling the upper swivelling structure of the crane body;

a swivelling control valve in communication with said swivelling hydraulic motor for controlling the pressure of hydraulic oil to be fed to said swivelling hydraulic motor;

a hydraulic circuit in communication with said swivelling control valve for swivelling operation which controls the amount of operation of said swivelling control valve;

a hydraulic motor connected to said counterweight dolly which drives each of said plurality of wheels of the dolly;

a dolly control valve in communication with said hydraulic motor for controlling the pressure of hydraulic oil to be fed to said hydraulic motor for the countereweight dolly; and a control circuit in communication with said dolly control valve for actuating said dolly control valve in accordance with an operational pressure of said hydraulic circuit for swivelling operation and for controlling a driving pressure for said hydraulic motor for the dolly under a pressure proportional to the driving pressure for said swivelling hydraulic motor.

2. A hydraulic drive system according to claim 1, further comprising an operating lever and means for driving said swivelling hydraulic motor under a driving pressure proportional to an amount of operation of said operating lever.

3. A hydraulic drive system according to claim 2, further comprising means for driving said hydraulic motor for the counterweight dolly under a driving pressure proportional to both an amount of operation of said operating lever and said driving pressure for said swivelling hydraulic motor.

4. A hydraulic drive system according to claim 1, wherein said swivelling control valve comprises a pressure control logical valve which includes a first, second, third and fourth check valve for both direction control and pressure control and including cavitation preventing check valves.

5. A hydraulic drive system according to claim 4, wherein said dolly control valve comprises a pressure control valve of the same structure as said swivelling control valve.

* * * * *